United States Patent [19]
Gray, Jr. et al.

[11] Patent Number: 5,609,131
[45] Date of Patent: Mar. 11, 1997

[54] MULTI-STAGE COMBUSTION ENGINE

[75] Inventors: Charles L. Gray, Jr., Pinckney; Karl H. Hellman, Ann Arbor, both of Mich.

[73] Assignee: The United States of America as represented by the Administrator of the U.S. Environmental Protection Agency, Washington, D.C.

[21] Appl. No.: 540,767

[22] Filed: Oct. 11, 1995

[51] Int. Cl.⁶ ........................................................ F02B 3/04
[52] U.S. Cl. .............................................. 123/299; 123/37
[58] Field of Search .............................. 123/37, 299, 300

[56] References Cited

U.S. PATENT DOCUMENTS

| | | | |
|---|---|---|---|
| 3,626,910 | 12/1971 | Porsche et al. | 123/37 X |
| 4,836,161 | 6/1989 | Abthoff et al. | 123/299 |
| 5,265,562 | 11/1993 | Kruse | 123/37 X |

Primary Examiner—Tony M. Argenbright
Attorney, Agent, or Firm—Lorusso & Loud

[57] ABSTRACT

The invention is a combustion method for operation of a multiple cylinder internal combustion engine in a cycle including intake, compression, expansion and exhaust strokes. A first amount of fuel is introduced into each of the cylinders with introduction initiated earlier than 45° before top dead center of a combustion stroke. An amount of air significantly in excess of that providing a stoichiometric amount of oxygen, typically 2–3 times stoichiometry, is also introduced into each of the cylinders to produce a first mixture upon introduction of the fuel, which mixture is ignited to produce a first combustion event. Subsequent to substantial completion of the first combustion event but prior to top dead center in the same compression stroke (or shortly after top dead center in the expansion stroke), a second amount of fuel is introduced into each of the cylinders without introduction of additional air. The second amount of fuel, products of combustion from the first combustion event and oxygen-depleted air form a second mixture which is ignited to produce a second combustion event. Utilizing two (or more) distinct combustion events in each "combustion cycle" significantly reduces the formation of $NO_x$.

13 Claims, 1 Drawing Sheet

MULTI-STAGE COMBUSTION ENGINE

FIELD OF THE INVENTION

The present invention is a new combustion process for internal-combustion engines that provides high fuel efficiency while significantly reducing the formation of $NO_x$. The primary field of application is motor vehicle engines.

BACKGROUND OF THE INVENTION

The growing utilization of automobiles greatly adds to the atmospheric presence of various pollutants including oxides of nitrogen and greenhouse gases such as carbon dioxide. Accordingly, need exists for significant improvement in the efficiency of fuel utilization for automotive powertrains to reduce greenhouse gas emissions while achieving low levels of $NO_x$.

Current automobiles and light trucks primarily utilize gasoline-fueled engines which operate on the Otto cycle. These engines are characterized by operation near stoichiometry, i.e., operation where the amount of fuel and air that is metered to the engine is controlled such that just enough oxygen is available to fully burn the available fuel. Stoichiometric operation is maintained by reading the output of an oxygen sensor in the exhaust and adjusting the fuel accordingly. This "closed loop" operation is combined with an exhaust catalyst that is able to both reduce the $NO_x$ and oxidize unburned fuel emissions. Very low levels of these emissions are thus obtained.

Larger trucks and buses primarily utilize Diesel-fueled engines which operate on the Diesel cycle. These engines are characterized by unthrottled air induction, i.e., lean or excess-air combustion, high compression, and direct fuel injection. Major effort is currently being focused on adapting such engines to automobiles and light trucks because of their superior fuel economy characteristics. However, because these engines operate with excess air, conventional reduction catalysts cannot be used and exhaust $NO_x$ emissions remain high, especially at higher load operation.

SUMMARY OF THE INVENTION

Accordingly, it is an object of the present invention to provide for operation of a direct-injection, high-efficiency engine with excess air and also low exhaust emissions of $NO_x$ and greenhouse gases.

The quantity of $NO_x$ formed during combustion depends on the combustion temperature, the concentration of reactants (nitrogen and oxygen) the concentration of the combustion products in terms of NO versus $NO_2$, and the length of time at the specific conditions of the reaction. The equilibrium concentration of nitric oxide, NO, which is the principal oxide of nitrogen formed during combustion, increases rapidly with relatively small increases in temperature, at the high temperatures normally associated with combustion. In addition, the rate of reaction also increases rapidly with small temperature increases, in this same high temperature range of conventional combustion. Therefore, reducing the peak combustion temperature is a direct and very effective way of reducing the formation of NO.

Peak combustion temperature can be lowered by (1) reducing the compression ratio of the engine (The intake gas temperature before combustion is directly related both to its initial temperature and to the degree of compression, i.e., compression ratio. The heat then released during combustion further increases temperature to the peak combustion temperature.); (2) igniting the fuel late in the compression stroke so that peak combustion temperature occurs after the engine has begun its expansion stroke and the expansion process imparts a cooling effect on the combustion gases; and (3) increasing the ratio of the mass of the intake gases to the mass of fuel to be burned (this higher system mass to fuel ratio means that the heat resulting from combustion of the fuel must heat a larger relative mass and thus will reach a lower final or peak temperature).

With regard to the first approach (1), reducing the compression ratio below approximately 15 to 1 results in increasing losses in fuel efficiency and available power from the engine and so is not a desirable means of reducing peak temperature in conventional engines.

In the second approach, late combustion reduces fuel efficiency and increases exhaust gas temperature in conventional engines, so it is not viewed as a desirable means of reducing peak temperature.

The third approach (3), i.e., increasing the mass of intake gases relative to the mass of fuel burned, is a conventional means of reducing NO formation. For Diesel engines at light load there is significant excess air so that NO formation is reduced compared to operating with a limited (or throttled) air system. The Otto cycle does throttle the incoming air charge at light loads and thus often uses recirculated exhaust gas to mix with the incoming air to increase the mass of intake gases without increasing the mass of available oxygen. However, even in the case of a diesel engine, as the load on the engine increases (i.e., power required for a given speed increases) more oxygen is needed for combustion and the mass ratio of intake gases to fuel decreases and, with the associated increase in peak combustion temperature, NO formation increases.

The theory of operation of the present invention is that by performing combustion in two or more distinct stages, the peak temperature of each combustion process is less, as compared to what it would have been if the combustion occurred in one stage, and thus NO formation is reduced as well.

Accordingly, the preferred embodiment of the present invention provides a combustion method for a single or multiple cylinder internal combustion engine operating in four cycles with intake, compression, expansion and exhaust strokes. The method of the invention involves introducing into each of the cylinders a first amount of fuel and that amount of air providing significantly greater than the stoichiometric amount of oxygen to form a first mixture, introduction of the fuel being initiated earlier than 45° before top dead center (hereinafter "TDC") in a compression stroke. After igniting the first mixture to produce a first combustion event, a second amount of fuel is introduced into each of the cylinders to produce a second mixture, without introduction of additional air. Initiation of introduction of the second amount of fuel is subsequent to substantial completion of combustion of the first amount of fuel and prior to or shortly after TDC in the same compression stroke. The second amount of fuel is immediately ignited to produce a second combustion event.

Thus, in the present invention considering two stage combustion, during the compression stroke, a first fuel-air mixture is ignited at an optimum time before the piston reaches TDC. A sufficient quantity of fuel must be added to insure ignition and combustion, but not so much fuel that the peak combustion temperature is at a level where significant NO is formed, i.e., combustion must be very dilute. The dilute charge may be excess atmospheric air or a mixture of atmospheric air and recycled exhaust gas. A higher compression ratio will result in a higher pre-ignition temperature and thus lower the quantity of fuel required for combustion. While direct fuel injection normally gives heterogeneous or stratified combustion, in the present invention 1st stage fuel is injected at a significantly earlier point in the engine cycle, at a point in time sufficiently early to give homogeneous or near homogeneous combustion.

At or near the end of the foregoing, first combustion event, additional fuel (the amount depends on the desired power output of the engine) is injected directly into the combustion chamber where it is ignited and the second combustion event occurs. Because a significant quantity of the original oxygen was consumed in the first combustion event, the directly injected fuel must disperse throughout the chamber to access oxygen for reaction. As a result, a very highly diluted combustion takes place which minimizes the likelihood of localized "fuel rich" combustion and localized high peak temperatures and increased formation of NO. A generalized description of the theory of operation of the invention is that the first combustion event occurs in an extremely lean (and dilute) environment followed by the second combustion event occurring in a highly "exhaust gas" diluted mixture.

Since much of the total cycle energy release occurs during the first combustion event, the resultant pressure is available for expansion as the piston crosses TDC and begins the expansion stroke. The second combustion event can be timed so that the peak temperature is occurring while expansion is underway (in the power stroke) to further suppress the peak temperature. The second combustion event can either be homogeneous (or near homogeneous, due to the aforementioned enhanced diffusion) or more characteristic of the heterogeneous combustion typical of direct fuel injection (or "stratified charge") engine, depending on the timing of the 2nd stage injection.

DESCRIPTION OF THE PREFERRED EMBODIMENTS

Figure 1:
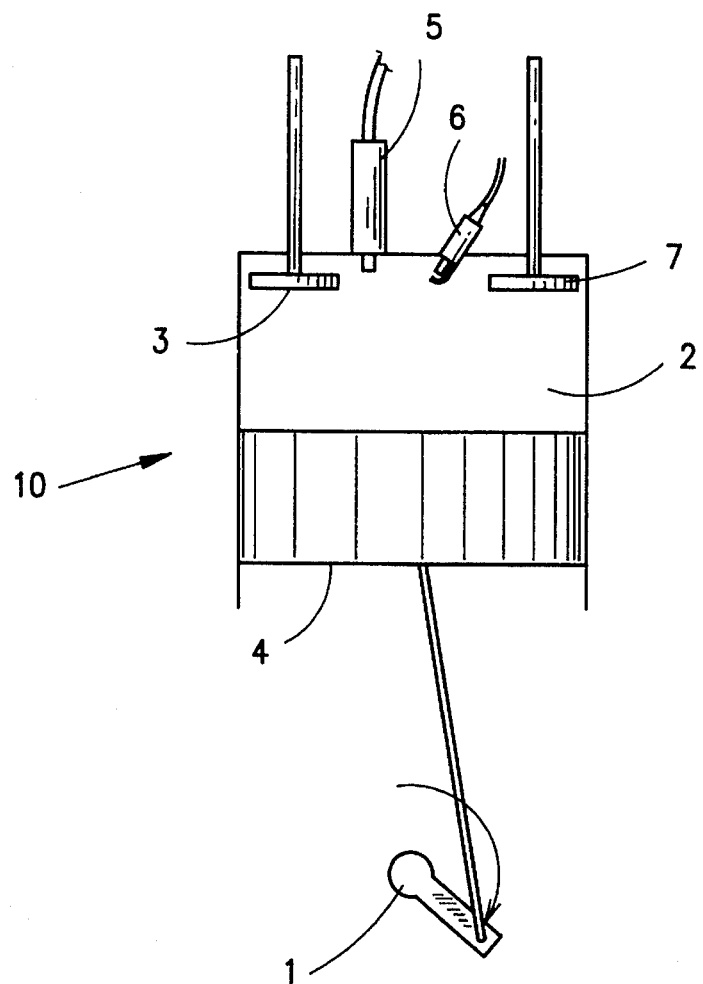
FIG. 1 is a schematic illustration of a single cylinder and piston of a multiple cylinder internal combustion engine operating in four cycles.

FIG. 1 illustrates a conventional reciprocating piston/cylinder 10 which operates in a four stroke cycle to drive a conventional crankshaft drive mechanism 1. During the intake stroke the air, optionally with exhaust gas added, is introduced into engine chamber 2 through intake valve 3 as the piston 4 travels from its top stroke position to its bottom stroke position. Intake valve 3 closes as the piston 4 nears its bottom stroke position. Compression occurs as the piston travels to its top stroke position. Stage 1 fuel is injected through fuel injector 5, preferably initiated at least 45° before TDC in the compression stroke, more preferably at least 90° before TDC, and optionally in the intake stroke. This allows fuel evaporation and charge cooling which reduces the work input required for compression and for the earlier injection timings forms a homogeneous or near homogeneous fuel/air mixture. While FIG. 1 shows the fuel injector in the cylinder head, in the alternative, fuel may be injected into the intake manifold for even greater mixing and more homogeneous combustion.

The amount of fuel injected for stage 1 combustion is a quantity short of what would cause uncontrolled pre-ignition, i.e., enough fuel to be ignitable by spark plug 6, but not so much fuel that pre-ignition occurs. After stage 1 fuel injection spark plug 6 initiates stage 1 combustion. Shortly thereafter, e.g. 20° or less before TDC, fuel injector 5 injects the fuel for stage 2 combustion. Again, spark plug 6 may be used for ignition. (However, instead of spark ignition, hot gas ignition, may be sufficient to initiate stage 2 combustion.) Expansion then occurs which produces crankshaft power in the conventional manner. As the piston reaches bottom dead center and begins to travel to its next top stroke position, the exhaust valve 7 has opened to allow discharge of the expanded gases. The cycle then repeats.

The amount of fuel introduced for first stage combustion is preferably an amount resulting in extremely lean combustion, i.e. combustion with much more than the stoichiometric amount of oxygen. Typically, the amount of fuel introduced will be limited so that the inducted air provides at least 1.5 times, and more preferably 2–3 times, the stoichiometric amount of oxygen. The range may vary somewhat with changes in the octane rating or composition of the fuel. In general, the upper limit for the amount of introduced fuel is that just under that amount giving preignition and the lower limit is the minimum required to provide ignition (lower flammability limit).

No additional oxygen is introduced for the second stage combustion event. Because much (e.g. 30–50%) of the oxygen introduced in the first stage has been consumed by the first combustion event, the second stage fuel must disperse throughout the chamber to access oxygen for reaction, thereby dispersing the heat release. Second stage fuel injection preferably begins 20°–5° before TDC (BTDC) and ends at 5° BTDC to 40° after TDC (ATDC).

For spark ignition engines, ignition of the fuel while the intake valve is open should be avoided because of the danger of a backfire into the intake manifold. The Bosch *Automotive Handbook* provides information regarding valve timing for typical spark ignition engines (page 240), that the range of intake valve closing is 40°–60° after bottom dead center (ABDC). This is 140°–120° BTDC, which is the earliest time a combustion event could be started for an "n-combustion" mode of engine operation. If the mixture is ignited at the earliest base 140° BTDC, if the bore is 90 mm and the combustion velocity is 10 m/s (page 246) at 100 RPM, the 9 ms will take 54° of crank angle. The first burn would end at 86° BTDC. When the second burn is ignited, the second burn could be over at 32° BTDC. If a third burn were employed, it would be complete at 22° ATDC. At 2000 RPM, the combustion would take 108°. The first combustion would end at 32° BTDC, and the second burn would end at 76° ATDC.

Conventional ignition timing is at the earliest about 40° BTDC, and the latest timing is about TDC (0° BTDC) (page 240). Conventional ignition timing is optimized to maintain the location of peak pressure at the best point, typically at 10°–15° ATDC.

Variations on the above-described embodiment include different timings for each of the direct fuel injection events, different ratios of fuel injected in one event versus the other event, and use of different means for initiating the combustion for each stage, e.g., a small quantity of fuel injected at a glow plug may be used to initiate the first combustion event.

In stage 1 peak combustion temperature is lower than in conventional single stage combustion because of the dilution by excess air and stage 2 peak combustion temperature is lower than in conventional single stage combustion because of much greater diffusion of the heat release.

Figure 2:
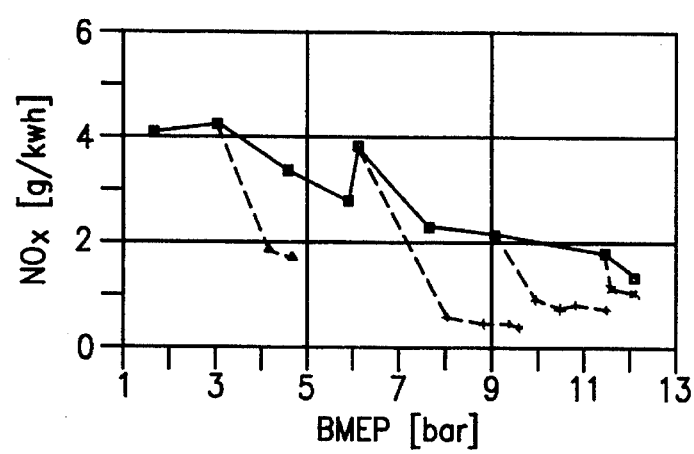
FIG. 2 is a graph of $NO_x$ emissions versus brake mean effective pressure.

The formation of NO is reduced by the above-described embodiments. In FIG. 2 the solid line presents results from a conventional direct fuel injection combustion process. $NO_x$ emissions are presented as a function of engine load (brake mean effective pressure or BMEP). The dashed lines in FIG. 2 show the result of two stage combustion, in accordance with the above-described embodiment, at four different engine load levels.

Alternate embodiments of the invention also include various internal combustion engines such as two-stroke piston and rotary engines, which can employ this new multi-stage combustion process. While engines that typically operate with excess combustion air may benefit the most from this new combustion process, it can also be utilized in engines "controlled" to provide a final combustion at stoichiometric conditions. Such stoichiometric engines will produce less NO and thus the dependency on a reduction catalyst will be lessened.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A combustion method for an internal combustion engine having at least one combustion chamber and operating in a cycle with at least compression and expansion strokes, said method comprising:

introducing air and a first amount of fuel into said combustion chamber in relative amounts providing substantially greater than the stoichiometric amount of oxygen, to form a first mixture, introduction of the first amount of fuel being initiated earlier than 45° before top dead center in the compression stroke;

igniting the first mixture to produce a first ignition and to initiate a first burn as a first combustion event;

introducing a second amount of fuel into said combustion chamber to produce a second mixture, without introduction of additional air, introduction of the second amount of fuel being initiated subsequent to the end of the first burn defined by substantial completion of combustion of said first amount of fuel; and igniting said second mixture to produce a second ignition and to initiate a second burn as a second combustion event distinct from said first combustion event.

2. The combustion method of claim 1 wherein the amount of air in said first mixture contains an amount of oxygen in the range of 2–3 times the stoichiometric amount of oxygen.

3. The combustion method of claim 1 wherein 30–50% of the air in said first mixture is consumed by said first combustion event.

4. The combustion method of claim 1 wherein said first amount of fuel is introduced 90° or more before top dead center in said compression stroke.

5. The combustion method of claim 1 wherein said first amount of fuel is introduced during the intake stroke.

6. The combustion method of claim 1 wherein said second amount of fuel is introduced 20° or less before said top dead center.

7. The combustion method of claim 4 wherein said second amount of fuel is introduced 20° or less before said top dead center.

8. The combustion method of claim 5 wherein said second amount of fuel is introduced 20° or less before top dead center in said compression stroke.

9. The combustion method of claim 1 wherein introduction of said second amount of fuel is initiated at least 50° after initiation of introduction of said first amount of fuel.

10. The combustion method of claim 1 wherein said cycle includes more than two complete and distinct combustion events.

11. The combustion method of claim 1 wherein said first ignition is effected by use of a spark plug and wherein said second ignition is separately effected by use of the same spark plug.

12. The combustion method of claim 1 wherein said first ignition is effected by use of a spark plug and said second ignition is separately effected as a hot gas ignition.

13. The combustion method of claim 1 wherein said second amount of fuel is introduced into said combustion chamber prior to top dead center in the same compression stroke.

\* \* \* \* \*